United States Patent
Bond et al.

(10) Patent No.: US 7,996,581 B2
(45) Date of Patent: Aug. 9, 2011

(54) DMA ENGINE

(75) Inventors: Andrew Bond, Bristol (GB); Peter Cumming, Wotton-Under-Edge (GB); Colman Hegarty, Bristol (GB)

(73) Assignee: Icera Inc., Wilmington, DE (US)

( * ) Notice: Subject to any disclaimer, the term of this patent is extended or adjusted under 35 U.S.C. 154(b) by 246 days.

(21) Appl. No.: 12/466,038

(22) Filed: May 14, 2009

(65) Prior Publication Data

US 2009/0287859 A1 Nov. 19, 2009

(30) Foreign Application Priority Data

May 16, 2008 (GB) .................................. 0808987.2

(51) Int. Cl.
 *G06F 13/28* (2006.01)
(52) U.S. Cl. ................. 710/22; 710/20; 710/21; 710/23
(58) Field of Classification Search .......................... None
 See application file for complete search history.

(56) References Cited

U.S. PATENT DOCUMENTS

| | | | |
|---|---|---|---|
| 5,894,560 A * | 4/1999 | Carmichael et al. ............ | 710/25 |
| 6,408,354 B1 | 6/2002 | Young | |
| 7,318,090 B1 * | 1/2008 | Fairman et al. ............... | 709/223 |
| 2002/0052987 A1 | 5/2002 | Collier | |
| 2005/0091390 A1 | 4/2005 | Helmer, Jr. et al. | |
| 2006/0179180 A1 * | 8/2006 | Sugita et al. .................... | 710/22 |
| 2008/0222317 A1 * | 9/2008 | Go et al. ......................... | 710/22 |

FOREIGN PATENT DOCUMENTS

WO  W02006/117562  11/2006

\* cited by examiner

*Primary Examiner* — Ilwoo Park
(74) *Attorney, Agent, or Firm* — Ryan, Mason & Lewis, LLP

(57) ABSTRACT

A circuit and corresponding method for transferring data. The circuit comprises: a CPU; a plurality of addressable devices; and a DMA engine coupled to the CPU and to those devices, the DMA engine comprising a plurality of DMA contexts each having fetch circuitry for fetching a DMA descriptor indicated by the CPU and transfer circuitry for transferring data from one to another of the devices based on a fetched descriptor. The DMA engine further comprises switching means operable to control a group of the contexts to alternate in a complementary sequence between fetching and performing a transfer, such that alternately one or more contexts in the group fetch while one or more others perform a transfer.

18 Claims, 3 Drawing Sheets

DMA ENGINE

PRIORITY CLAIM

The present application claims the priority of United Kingdom Patent Application No. GB 0808987.2 filed May 16, 2008.

FIELD OF THE INVENTION

The present invention relates to a Direct Memory Access (DMA) engine for transferring data between addressable devices.

BACKGROUND

DMA engines move a block of data from source to destination address autonomously from CPU control. The individual DMA transfer is configured using a descriptor normally containing the source address, destination address, a number of control parameters and a link to the next transfer for the DMA Engine to process once complete. Usually a DMA Engine will be constructed of a number of independent contexts processing transfers in parallel, each context having dedicated hardware for first fetching a descriptor and then transferring data from a source to a destination based on the fetched descriptor. The descriptor can be fetched from any memory the DMA engine has access to. This can be local dedicated memory or external off-chip memory.

Some transfers may be discontinuous. A discontinuous transfer is a transfer with non-sequential source and/or destination addresses. For example, a transfer N of bytes from A to B can be constructed from a single descriptor, but two descriptors are needed to transfer N bytes from A to B and M bytes from C to D. Some transfers may be circular. A circular transfer is a transfer whereby bytes are repeatedly transferred from source to destination, e.g. N bytes repeatedly transferred from A to B. After the first N bytes are transferred the DMA engine must fetch the same descriptor again to transfer the second N bytes (a DMA engine could be designed to recognize this kind of transfer, but that would require additional hardware).

As a DMA transfer can only manipulate the source and/or destination address for a transfer linearly, then discontinuous or circular data transfers must be constructed using a series of linked descriptors to describe the transfer fully.

Equally, as the control parameters must be constructed from a finite number of bits to describe the transfer size, long transfers may also require a series of linked descriptors.

This can create an issue when the bandwidth required for a transfer made up of a series of descriptors is high. The DMA engine must effectively pause the data transfer to fetch and decode the next descriptor. Naturally, whilst doing this the data throughput will temporarily drop.

In real-time critical applications the drop in throughput may not be acceptable. This can be solved by "brute force" by applying more and more hardware to the problem. That way, either the design must contain a mixture of distinct high and low bandwidth DMA engines or waste the additional resource required for high performance transfers when a lower bandwidth would suffice. Thus simply adding more hardware is wasteful in that it increases power and die size.

SUMMARY

According to one aspect of the invention, there is provided a circuit comprising: a CPU; a plurality of addressable devices; and a DMA engine coupled to the CPU and to said devices, the DMA engine comprising a plurality of DMA contexts each for fetching a DMA descriptor indicated by the CPU and for transferring data from one to another of said devices based on a fetched descriptor; wherein the DMA engine further comprises switching means operable to control a group of said contexts to alternate in a complementary sequence between fetching and performing a transfer, such that alternately one or more contexts in the group fetch whilst one or more others perform a transfer.

Thus the present invention allows the DMA engine to accommodate high bandwidth, real-time critical applications with very little additional hardware. The latency of a context's descriptor fetch is hidden because a transfer is serviced by another context in the group during that fetch.

In a preferred embodiment, the group may comprise at least one pair of said contexts, and the switching means may be operable to control the pair according to said complementary sequence by alternately controlling one context of the pair to fetch a descriptor whilst the other of the pair performs a transfer and vice versa.

Alternating between two contexts of a pair has been found to be the most effective in hiding the latency of the fetch.

In a particularly advantageous embodiment, the switching means may comprise selection means operable to set the DMA engine into a selected one of: a first mode in which the switching means is configured to control the contexts of said group according to said complementary sequence, and a second mode in which the contexts of said group are allowed to operate independently.

This advantageously enables the behaviour of the DMA engine to be selectively configured for either high bandwidth, real-time critical applications or lower bandwidth highly parallel applications, again with minimal extra hardware. So a single design can be used for focused high bandwidth real-time data transfers or parallel lower bandwidth data transfers as required.

Preferably, the selection means may comprise a first software-accessible register of at least one bit arranged to set said mode and to be writeable by software executed on the CPU.

This advantageously enables the programmer to configure the DMA engine, under software control, to select the behaviour for either high bandwidth, real-time critical applications or lower bandwidth highly parallel applications. So the DMA engine can be re-configured on-the-fly to suit either requirement.

In further embodiments, the switching means may comprises a second software-accessible register of at least one bit arranged to record which of said group is currently fetching and which of said group is currently performing a transfer, and the switching means may be arranged to determine which of said group are subsequently to fetch and which are subsequently to perform a transfer in dependence on said second register.

The circuit may comprise storage means coupled to the CPU, and the switching means may comprise software stored in the storage means and arranged such that when executed by the CPU it supplies to the DMA engine a list of descriptors partitioned into a separate linked list for each context of said group so as to control the contexts to operate in said complementary sequence.

Said CPU, devices and DMA engine may be integrated onto the same integrated circuit.

In one particularly advantageous application of the present invention, one of said devices may comprise an RF interface, and the CPU may be programmed to execute code to operate the DMA engine to transfer data between the RF interface and another of said devices, using said complementary sequence, in order to communicate over a wireless cellular network.

The invention is particularly (but not exclusively) suited to wireless RF communications over a cellular networks, where high bandwidth is typically required and the communications are often real-time critical.

According to another aspect of the present invention, there is provided a method of transferring data, the method comprising: supplying an indication of a plurality of DMA descriptors to a DMA engine comprising a plurality of DMA contexts; and operating a group of said contexts to each fetch a respective one or more of the indicated descriptors and based thereon to perform a corresponding one or more transfers of data from one to another of a plurality of addressable devices; wherein said operation of the group comprises controlling the contexts of the group to alternate in a complementary sequence between fetching and performing a transfer, such that alternately one or more contexts in the group fetch whilst one or more others perform a transfer.

According to another aspect of the present invention, there is provided user equipment comprising: a CPU; a plurality of addressable devices; and a DMA engine coupled to the CPU and to said devices, the DMA engine comprising a plurality of DMA contexts each for fetching a DMA descriptor indicated by the CPU and for transferring data from one to another of said devices based on a fetched descriptor; wherein the DMA engine further comprises switching means operable to control a group of said contexts to alternate in a complementary sequence between fetching and performing a transfer, such that alternately one or more contexts in the group fetch whilst one or more others perform a transfer.

According to another aspect of the present invention, there is provided a computer program product for transferring data, the program comprising code which when executed by a processor performs the steps of: supplying an indication of a plurality of DMA descriptors to a DMA engine comprising a plurality of DMA contexts; and operating a group of said contexts to each fetch a respective one or more of the indicated descriptors and based thereon to perform a corresponding one or more transfers of data from one to another of a plurality of addressable devices; wherein said operation of the group comprises operating a switching means to control the contexts of the group to alternate in a complementary sequence between fetching and performing a transfer, such that alternately one or more contexts in the group fetch whilst one or more others perform a transfer.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

Figure 1:
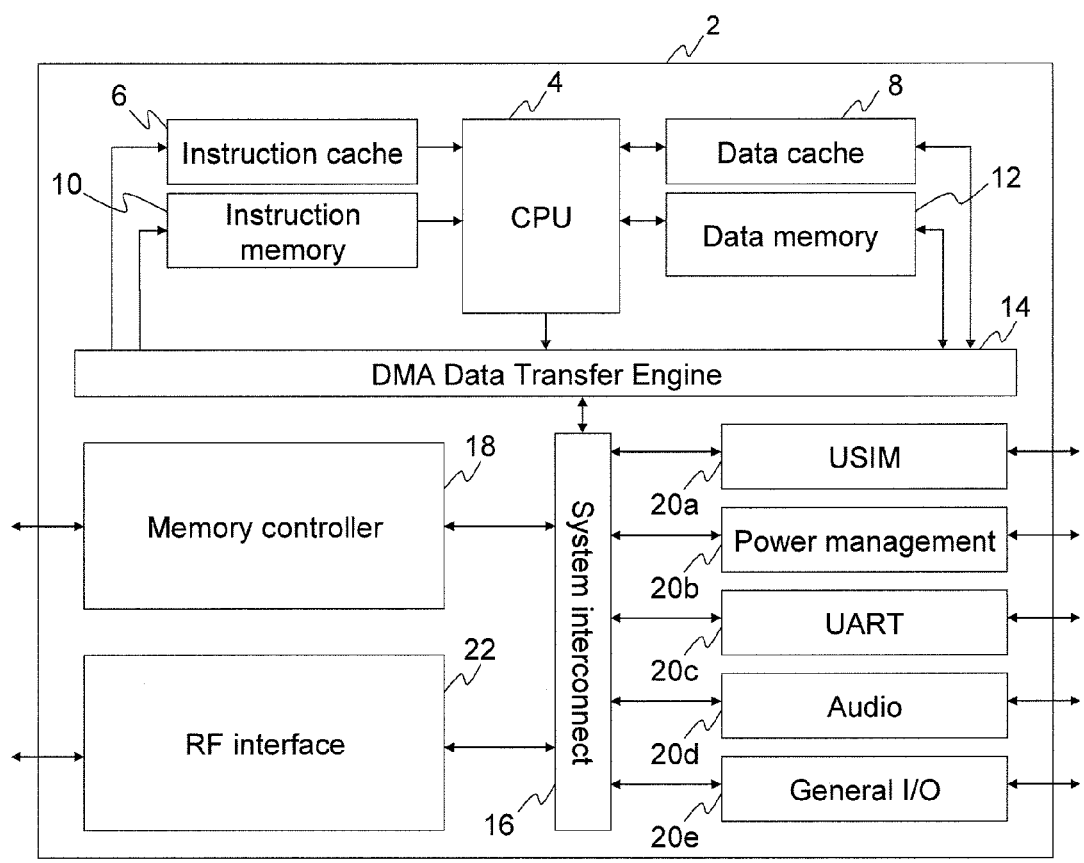
FIG. 1 is a schematic block diagram of an integrated circuit having a processor.

As an example application of the present invention, FIG. 1 schematically illustrates an integrated circuit (IC) chip 2 for use in a user equipment such as a mobile phone or other mobile terminal. The circuit 2 comprises a central processing unit (CPU) 4 to which is coupled an instruction memory 10, a data memory 12, an instruction cache 6, and a data cache 8. The circuit 2 comprises a DMA engine made up of a data transfer engine 14 plus some software executed on the CPU 4 for setting up the DMA's data transfer engine 14. Each of the instruction memory 10, data memory 12, instruction cache 6 and data cache 8 are coupled to the data transfer engine 14, which in turn is coupled to a system interconnect 16 comprising a data bus and an address bus. The CPU 4 is also operatively coupled to the data transfer engine 14 for supplying DMA descriptors. The system interconnect 16 couples between the data transfer engine 14, a memory controller 18, and various on-chip devices in the form of peripheral interfaces 20 and 22 which connect to external devices, i.e. external to the integrated circuit 2. The memory controller 18 connects to one or more external memory devices (not shown). For example, the memory controller 18 may support a connection to RAM such as SDRAM or mobile DDR, to flash memory such as NAND flash or NOR flash, and/or to a secure ROM. Examples of peripheral interfaces include a radio frequency (RF) interface 22 and one or more additional peripheral interfaces 20. Each of the one or more additional peripheral interfaces 20 connects to a respective external peripheral (also not shown). For example, the peripheral interfaces 20 may include a USIM interface 20a, a power management interface 20b, a UART interface 20c, an audio interface 20d, and/or a general purpose I/O interface 20e. The RF peripheral interface 22 connects with an external RF front-end and antenna (also not shown), and ultimately with a wireless cellular network over an air interface.

In a preferred embodiment, the chip used is designed by Icera and sold under the trade name Livanto®. Such a chip has a specialized processor platform described for example in WO2006/117562.

In a preferred application of the present invention, the integrated circuit 2 is configured as a software modem, or "soft modem", for handling wireless communications with a wireless cellular network. The principle behind software modem is to perform a significant portion of the signal processing and other functions required for the wireless communications in a generic, programmable, reconfigurable processor, rather than in dedicated hardware.

Preferably, the software modem is a soft baseband modem. That is, on the receive side, all the radio functionality from receiving RF signals from the antenna up to and including mixing down to baseband is implemented in dedicated hardware. Similarly, on the transmit side, all the functionality from mixing up from baseband to outputting RF signals to the antenna is implemented in dedicated hardware. However, all functionality in the baseband domain is implemented in software stored in the instruction memory 10, data memory 12 and external memory, and executed by the CPU 4.

In a preferred implementation, the dedicated hardware in the receive part of the RF interface 22 may comprise a low noise amplifier (LNA), mixers for downconversion of the received RF signals to intermediate frequency (IF) and for downconversion from IF to baseband, RF and IF filter stages, and an analogue to digital conversion (ADC) stage. An ADC is provided on each of in-phase and quadrature baseband branches for each of a plurality of receive diversity branches. The dedicated hardware in the transmit part of the RF interface 22 may comprise a digital to analogue conversion (DAC) stage, mixers for upconversion of the baseband signals to IF and for upconversion from IF to RF, RF and IF filter stages, and a power amplifier (PA). Optionally, some of these stages may be implemented in an external front-end (in which case the RF interface may not necessarily input and output RF signals per se, but is still referred to as an RF interface in the sense that it is configured to communicate up/downconverted or partially processes signals with the RF front-end for the ultimate purpose of RF communications). The interface 22 may comprise an analogue RF interface and/or a digital radio interface such as a DigRF interface. Details of the required hardware for performing such radio functions will be known to a person skilled in the art.

Received data is passed from the RF interface 22 to the CPU 4 for signal processing, via the system interconnect 16, data transfer engine 14 and data memory 12. Data to be transmitted is passed from the CPU 4 to the RF interface 22 via the data memory 12, data transfer engine 14 and system interconnect 16.

The software running on the processor 4 may then handle functions such as: modulation and demodulation, interleaving and de-interleaving, rate matching and de-matching, channel estimation, equalization, rake processing, bit log-likelihood ratio (LLR) calculation, transmit diversity processing, receive diversity processing, Multiple-input Multiple-Output (MIMO) processing, voice codecs, link adaptation by power control or adaptive modulation and coding, and/or cell measurements.

As mentioned, a DMA engine moves a block of data from source to destination address autonomously from CPU control. Specifically, the DMA allows data to be transferred directly between memory devices and/or other memory-addressable devices such as peripheral interfaces without that data needing to pass via the CPU 4. Without DMA, the CPU would have to read data from the destination device into one or more of the CPU's operand registers, and then write that data from its operand registers to the destination device. This would be wasteful of processor resources, especially where several bytes are to be transferred, because the CPU would have to be occupied throughout the entire transfer. But using DMA, software running on the CPU 4 simply sets up the DMA's data transfer engine 14 to transfer the data directly by supplying it with an indication allowing the relevant descriptor or descriptors to be fetched (the descriptor normally containing the source address, destination address, a number of control parameters and a link to the next transfer for the data transfer engine 14 engine to process once complete). After the set up, the CPU 4 can then continue with other tasks whilst the data transfer engine 14 completes the transfer independently of the CPU 4 based on the fetched descriptor(s).

Note that, as will be familiar to a person skilled in the art, the term "Direct Memory Access" does not limit the DMA engine to performing transfers involving memory devices. More generally, the transfer can be between any "memory mapped" or "memory addressable" device, meaning any device which is accessed by means of an address in a similar manner to a memory location. So in the example shown, the peripherals interfaces 20 and 22 are incorporated into the same addressing scheme as that of the memory devices 6, 8, 10, 12 and 18, and are accessible via the system interconnect 16 by means of memory-addressable registers in the peripherals 20 and RF interface 22. So for example, the DMA engine could be used to transfer data directly between two peripheral interfaces 20, between a peripheral interface 20 and the RF interface 22, or between a peripheral interface 20 or RF interface 22 and a memory device 6, 8, 10 or 12.

In the following embodiment, the DMA engine comprises switching means for alternating contexts in a complementary manner such that one fetches a descriptor whilst the other performs a transfer of data. This switching means comprises a small amount of dedicated circuitry in the form of some additional registers, plus software executed on the CPU 4 operating in conjunction with the registers to achieve the required alternation.

Figure 2:
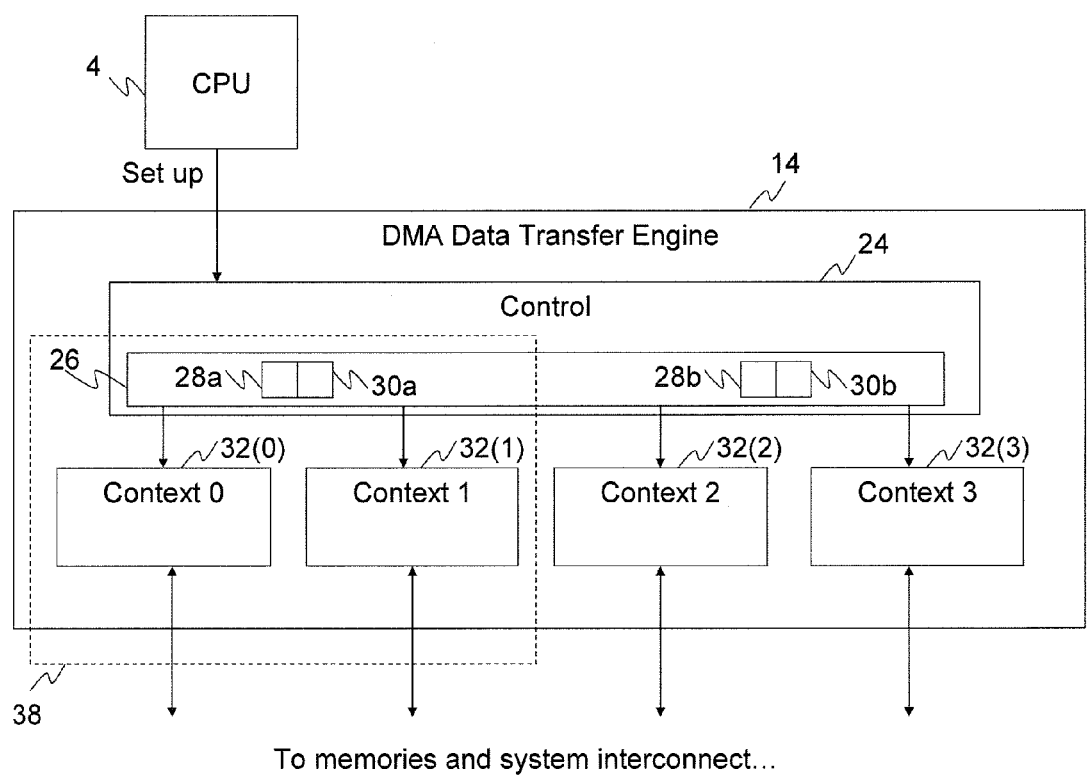
FIG. 2 is a schematic block diagram of a DMA engine.

The DMA data transfer engine 14 is now discussed in more detail in relation to the schematic block diagram of FIG. 2. The data transfer engine 14 comprises a control block 24 and a plurality of DMA contexts 32(0) . . . 32(3). Only four contexts are shown here for simplicity, but in a preferred embodiment there may be more like forty contexts, and in general it will be understood that any number N could be provided from two upwards. N is preferably even. The control block comprises context alternation circuitry 26 which facilitates the grouping of the contexts 32(0) . . . 32(3) into pairs. One such pair is shown labelled 38. The context alternation circuitry 26 comprises an "OddNotEven" register 28 having a respective bit 28a and 28b for each of the pairs of said contexts 32, the OddNotEven register 28 being operatively coupled to the CPU 4 and accessible to software. The context alternation circuitry 26 further comprises a "enable" register 30 comprising a respective bit 30a and 30b for each context pair, the enable register 30 also being operatively coupled to the CPU 4 and accessible to software.

Each context 32(0) . . . 32(3) has fetch circuitry for fetching DMA descriptors specified by software executed on the CPU 4 in the setup, and transfer circuitry for performing the DMA transfer described by descriptor fetched by that context's fetch circuitry. Each of the fetch and transfer circuitry of each context is coupled to the system interconnect 16 and memory devices 6, 8, 10 and 12.

It should be noted that separate hardware to perform descriptor fetch and data transfer is not necessarily provided for every context, especially if there is a large number of contexts such as 40. In embodiments, contexts can share (a) the hardware for performing descriptor fetches and/or (b) the hardware for performing data transfers. For example, there may be a smaller pool of fetch units and transfer units which are allocated to contexts as and when they are needed. In general the number of fetch and transfer units may be less than the number of contexts (this reflects the fact that only a subset of contexts may ever be active simultaneously). In the case where the fetch and/or transfer units are shared, each context may comprise at least a register for holding an indication of a descriptor received from the CPU 4 in the set-up (e.g. the descriptor address) and logic for associating the fetch and/or transfer units with that context, e.g. by supplying the address to a fetch unit. But the possibility of a dedicated fetch unit and/or transfer unit per context is not excluded.

The context alternation circuitry 26 enables two modes of operation. In the first, referred to herein for illustrative purposes as a "ping-pong" mode, a pair of contexts operate as a complementary pair whereby one fetches a DMA descriptor whilst the other performs a transfer and vice versa. In the second mode, the contexts 32 of a pair are allowed to operate independently of one another. The mode is set by software executed on the CPU 4 writing to the enable register 30. Preferably, the context alternation circuitry 26 is operable to set the mode for each pair separately by means of different respective bits in the enable register 30 for each of the different pairs, i.e. so some pairs of contexts 32 can be set to the ping-pong mode whilst other pairs can be allowed to operate separately. So setting the Enable bit per context pair indicates that the context pair is to operate in descriptor prefetch mode. Hardware then controls when a context fetches the next descriptor or performs a data transfer, since the intent is to avoid the need for continuous software intervention.

The use of the context alternation circuitry 26 by software executed on the CPU 4 is discussed in more detail below.

In a DMA engine with N parallel contexts (N even) the context alternation circuitry 26 allows any even/odd pair of contexts (contexts numbers 0 and 1, 2 and 3, ... N−2 and N−1) to be configured by software to form a descriptor pre-fetching pair (e.g. pair 38) by setting the respective enable bit in the software-visible register 30 containing one bit per context pair. A DMA transfer configured to perform descriptor pre-fetching will completely hide the latency of a descriptor fetch from memory from a hardware peripheral making the DMA requests, at the cost of twice as many context resources (two rather than one). The contexts within the pair are referred to herein for illustrative purposes as "even and odd ping-pong contexts". Advantageously, only very minimal extra hardware is required to support this capability.

N.B. The peripheral cannot "make" make a request per se. The CPU 4 is solely responsible for invoking a new DMA transfer. Once the descriptor has been fetched however, the peripheral can control when the data is actually transferred. This is usually done by providing a synchronization signal from the peripheral (usually "FIFO is not full" for transfers to the peripheral, or "FIFO is not empty" for transfers from the peripheral) to the DMA engine. An exception to this could be the on-chip debug unit. As this provides access to all mapped register state it can also "make" a DMA request similar to a CPU.

Descriptor information is typically passed from software executed on the CPU 4 to the data transfer engine 14 as a linked-list of M descriptor data structures in internal or external memory. For descriptor pre-fetching, software partitions the linked-list into two linked-lists: the first one assigned to the even context containing descriptors 0, 2, ... M−2 from the original un-partitioned linked list and the second assigned to the odd context containing descriptors 1, 3, ... M−1 in the case where M is even. When M is odd the list assigned to the odd context will contain one less descriptor.

The software-visible OddNotEven register 28 is defined containing one bit per context pair. Software initializes the bit corresponding to a context pair to zero before commencing a descriptor pre-fetching or "ping-pong" DMA using that context pair. Software initializes the DMA operation by writing the addresses of descriptors 0 and 1 to the even and odd contexts respectively. Each context will fetch its descriptor from memory and the DMA engine 14 is now ready to respond to requests from a peripheral.

When the OddNotEven bit for a context pair is zero (even) peripheral requests are mapped to the even context. This will therefore respond to peripheral requests and perform the data transfers defined in descriptor 0. Whenever a descriptor completes on a context in a descriptor pre-fetching pair, the OddNotEven bit for the pair is toggled—in this case to 1 (odd). This now causes the odd context to respond to peripheral requests and perform the data transfers defined in descriptor 1. Meanwhile context 0 will fetch the next descriptor is its linked-list (descriptor 2). When descriptor 1 completes on the odd context the OddNotEven bit is returned to 0 (even) and the even context will perform the transfer defined by descriptor 2 and so on. In this way each descriptor fetch (apart from the first) is performed by one context in the pair while the other is servicing peripheral requests, so the latency of the descriptor fetch from memory should be completely hidden from the peripheral. This is in contrast to a conventional DMA where the descriptor fetch from memory must be performed after the last peripheral request of the current descriptor and before the first peripheral request for the next descriptor.

Figure 3:
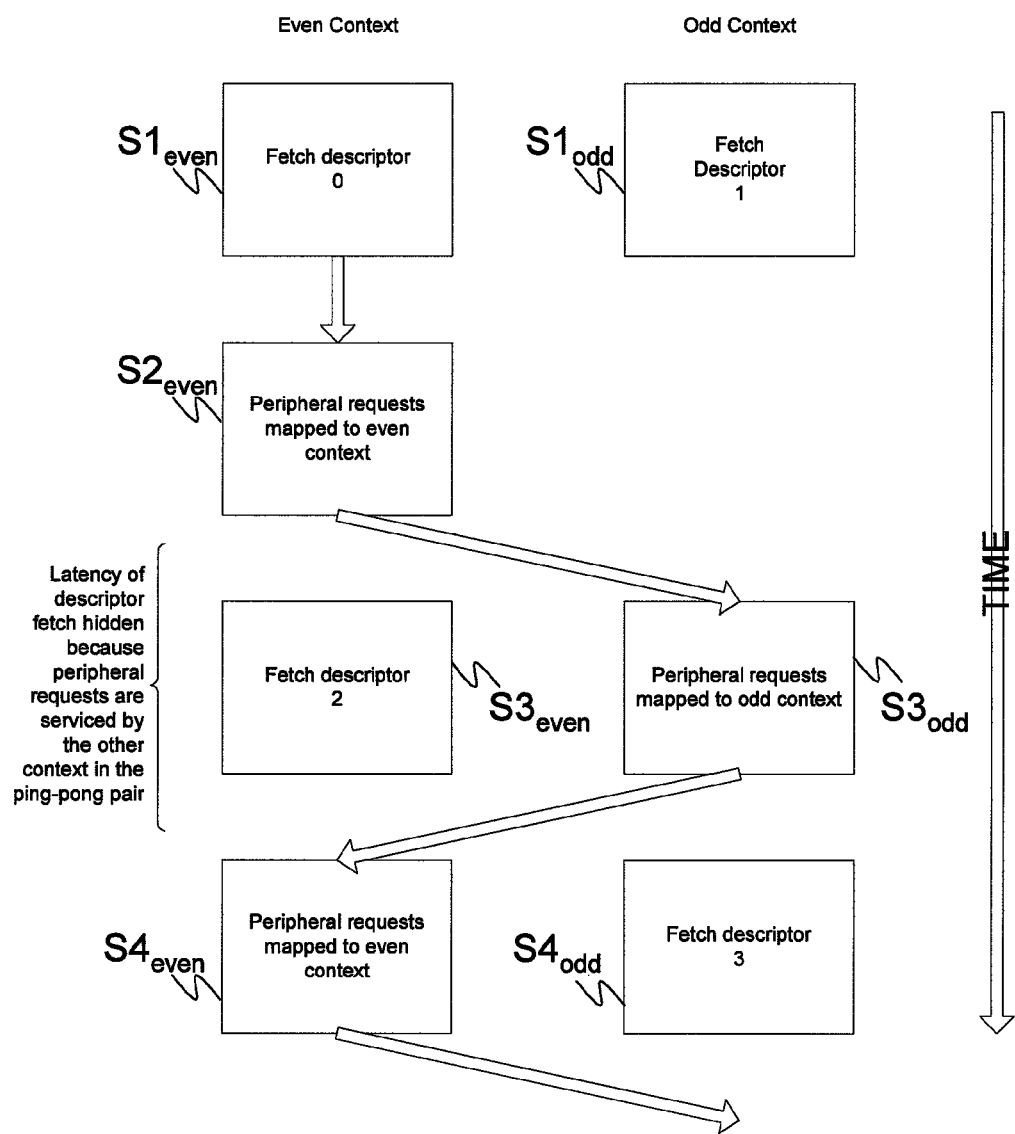
FIG. 3 is a flow chart showing the operation of the DMA engine of FIG. 2.

The operation of a ping-pong DMA is shown schematically in the flow chart of FIG. 3. At step $S1_{even}$ the first context of a pair fetches a first DMA descriptor (descriptor 0). At the same time, at step $S1_{odd}$ the other context of a pair fetches a second DMA descriptor (descriptor 1). In a subsequent DMA cycle at step $S2_{even}$, the first context performs a transfer based on the first descriptor. In that cycle, the second context does nothing in order to initially synchronize the ping-pong. In the next subsequent cycle, the first context fetches a third descriptor (descriptor 2), and at the same time the odd context performs a transfer based on the second descriptor at step $S3_{odd}$. This means the latency of fetching the second descriptor using the first context is hidden by the transfer performed using the odd context based on the second descriptor. Conversely, then at the next DMA cycle, the even context performs a transfer based on the third descriptor at step $S4_{even}$, and at the same time the odd context fetches a fourth descriptor (descriptor 3). Thus the latency of the fetching of the fourth descriptor using the odd context is hidden by the transfer performed using the even context based on the third descriptor. The method proceeds in this manner for as long as required for the series of linked descriptors in question, with the even and odd contexts alternating in a complementary manner between one fetching whilst the other performs a transfer and vice versa.

Thus the described embodiment allows a user, under software control, to pair DMA contexts allowing one to fetch the next descriptor whilst the other transfers the current descriptor's data. This effectively hides the descriptor fetch latency from the transfer, when critical bandwidth is required, with very little additional hardware assuming the data transfer engine 14 already consists of multiple parallel contexts. This enables the programmer to configure a general purpose DMA engine, under software control, tuning the behaviour towards either high bandwidth, real-time critical applications or lower bandwidth, highly parallel applications with very little additional hardware.

Previously to achieve such high bandwidth, low latency descriptor fetching characteristics, prior art has had to implement dedicated hardware. This has meant either the design must contain a mixture of distinct high and low bandwidth DMA Engines or waste the additional resource required for high performance transfers when a lower bandwidth would suffice.

The described DMA engine has a particularly advantageous application to a soft modem, because the transfers to and/or from the RF interface 22 are high bandwidth and real-time critical, which as explained is exactly the kind of transfer to which the DMA engine is suited. Also in a software modem, there are likely to be a number of other processes going on requiring transfers between various other devices 6, 8, 10, 12 and 20, some of which may require lower bandwidth but highly parallel behaviour, and thus it is useful to be able to configure the DMA engine using software as appropriate to the task in question. The use of a small number of additional software-accessible registers 28 and/or 30 to in the context alternation circuitry 26 is particularly compatible with the software modem "philosophy".

It will be appreciated that the above embodiments are described only by way of example. In other embodiments for instance, the invention could be applied to devices other than a software modem.

Further, the alternation of contexts need not necessarily be in pairs. For example, using a group of three, one context of the group could perform a transfer while two other contexts fetched a descriptor, with the transfer alternating cyclically throughout the three. This would work particularly well if a transfer took twice as long as a fetch. Or in general any kind of complementary sequence of alternations between fetching and transferring could be used, whereby one or more contexts in the group fetches whilst one or more others perform a transfer, with the pattern alternating in a cyclical manner. In general, using groups of greater than two might be beneficial if the time taken by a transfer is different from the descriptor fetch. This could be the case for example if the data was kept in a very low latency memory and the descriptors in very high latency memory, in which case the time taken by a transfer would be less than the descriptor fetch. The descriptor fetch latency could be reduced by adding hardware. Once solution would be to have a descriptor cache locally within the DMA engine. This could effectively remove the fetch latency for commonly used descriptors.

Further, although the above switching means has been described only as comprising OddNotEven register 28 and Enable register 30 in conjunction with software using those registers to control the alternation, in alterative embodiments more of the functionality could be implemented in dedicated hardware and/or one or both of the registers 28 and 30 could be replaced alternative means. For example, the function of one or both of these registers could be performed in software, in which case the switching means comprises a suitable storage location such as data cache 8 for recording the relevant information, along with appropriate code stored on a memory such as instruction memory 12 and executed by the CPU.

Other applications and configurations may be apparent to the person skilled in the art given the disclosure herein. The scope of the invention is not limited by the described embodiments, but only by the following claims.

The invention claimed is:

1. A circuit comprising:
  a CPU;
  a plurality of addressable devices; and
  a DMA engine coupled to the CPU and to said devices, the DMA engine comprising a plurality of DMA contexts each for fetching a DMA descriptor indicated by the CPU and for transferring data from one to another of said devices based on a fetched descriptor;
  wherein the DMA engine further comprises switching means operable to control a group of said contexts to alternate in a complementary sequence between fetching and performing a transfer, such that alternately one or more contexts in the group fetch whilst one or more others perform a transfer.

2. The circuit of claim 1, wherein the group comprises at least one pair of said contexts, the switching means being operable to control the pair according to said complementary sequence by alternately controlling one context of the pair to fetch a descriptor whilst the other of the pair performs a transfer and vice versa.

3. The circuit of claim 1, wherein the switching means comprises selection means operable to set the DMA engine into a selected one of: a first mode in which the switching means is configured to control the contexts of said group according to said complementary sequence, and a second mode in which the contexts of said group are allowed to operate independently.

4. The circuit of claim 3, wherein the selection means comprises a first software-accessible register of at least one bit arranged to set said mode and to be writeable by software executed on the CPU.

5. The circuit of claim 1, wherein the switching means comprises a second software-accessible register of at least one bit arranged to record which of said group is currently fetching and which of said group is currently performing a transfer, the switching means being arranged to determine which of said group are subsequently to fetch and which are subsequently to perform a transfer in dependence on said second register.

6. The circuit of claim 1, comprising storage means coupled to the CPU, the switching means comprising software stored in the storage means and arranged such that when executed by the CPU it supplies to the DMA engine a list of descriptors partitioned into a separate linked list for each context of said group so as to control the contexts to operate in said complementary sequence.

7. The circuit of claim 1, wherein said CPU, devices and DMA engine are integrated onto the same integrated circuit.

8. The circuit of claim 1, wherein one of said devices comprises an RF interface, and the CPU is programmed to execute code to operate the DMA engine to transfer data between the RF interface and another of said devices, using said complementary sequence, in order to communicate over a wireless cellular network.

9. A method of transferring data, the method comprising:
  supplying an indication of a plurality of DMA descriptors to a DMA engine comprising a plurality of DMA contexts; and
  operating a group of said contexts to each fetch a respective one or more of the indicated descriptors and based thereon to perform a corresponding one or more transfers of data from one to another of a plurality of addressable devices;
  wherein said operation of the group comprises controlling the contexts of the group to alternate in a complementary sequence between fetching and performing a transfer, such that alternately one or more contexts in the group fetch whilst one or more others perform a transfer.

10. The method of claim 9, wherein the group comprises at least one pair of said contexts, and said operation of the group comprises controlling the pair according to said complementary sequence by alternately controlling one context of the pair to fetch a descriptor whilst the other of the pair performs a transfer and vice versa.

11. The method of claim 9, comprising changing between: a first mode in which said operation of the group comprises controlling the contexts of said group according to said complementary sequence, and a second mode in which the contexts of said group are allowed to operate independently.

12. The method of claim 11, wherein the changing between the modes comprises executing software to write to a first register of at least one bit arranged to set said mode.

13. The method of claim 9, comprising executing software to write to a second register of at least one bit to record which of said group is currently fetching and which of said group is currently performing a transfer, wherein said operation of the group comprises determining which of said group are subsequently to fetch and which are subsequently to perform a transfer in dependence on said second register.

14. The method of claim 9, wherein said operation of the group comprise supplying to the DMA engine a list of descriptors partitioned into a separate linked list for each context of said group so as to control the contexts to operate in said complementary sequence.

15. The method of claim 9, performed on a DMA engine integrated onto the same integrated circuit as an associated CPU and said devices.

16. The method of claim 9, wherein one of said devices comprises an RF interface, and method comprises executing software to operate the DMA engine to transfer data between the RF interface and another of said devices, using said complementary sequence, in order to communicate over a wireless cellular network.

17. A user equipment comprising:
  a CPU;
  a plurality of addressable devices; and a DMA engine coupled to the CPU and to said devices, the DMA engine comprising a plurality of DMA contexts each for fetching a DMA descriptor indicated by the CPU and for transferring data from one to another of said devices based on a fetched descriptor;

wherein the DMA engine further comprises switching means operable to control a group of said contexts to alternate in a complementary sequence between fetching and performing a transfer, such that alternately one or more contexts in the group fetch whilst one or more others perform a transfer.

18. A computer program product for transferring data, the program comprising code which when executed by a processor performs the steps of:

supplying an indication of a plurality of DMA descriptors to a DMA engine comprising a plurality of DMA contexts; and operating a group of said contexts to each fetch a respective one or more of the indicated descriptors and based thereon to perform a corresponding one or more transfers of data from one to another of a plurality of addressable devices;

wherein said operation of the group comprises operating a switching means to control the contexts of the group to alternate in a complementary sequence between fetching and performing a transfer, such that alternately one or more contexts in the group fetch whilst one or more others perform a transfer.

* * * * *